United States Patent
Tarducci et al.

[15] 3,701,541
[45] Oct. 31, 1972

[54] FOLDING BAGS TO BE USED IN SHOPPING HAVING COLLAPSIBLE WHEELS, AND CAPABLE TO BE REDUCED TO A HAND-BAG

[72] Inventors: Tullio Tarducci, Via Caffaro 82, 00154; Alvaro Gatti, Via Alessandro Puerio; Antonio Buffa, Via Tozzi No. 37, all of Rome, Italy

[22] Filed: April 24, 1970

[21] Appl. No.: 31,506

[52] U.S. Cl. ..................................280/37, 280/39
[51] Int. Cl. .....................................B62b 11/00
[58] Field of Search......280/36, 36 C, 37, 38, 39, 40, 280/DIG. 3, DIG. 4, 43.1, 41, 41 C, 47.24; 190/18, 18 A; 248/97, 98

[56] References Cited

UNITED STATES PATENTS

| | | | |
|---|---|---|---|
| 1,718,962 | 7/1929 | Kimball | 280/DIG. 3 |
| 2,549,958 | 4/1951 | Bosk | 280/37 |
| 2,505,440 | 4/1950 | Taber et al. | 280/38 |
| 2,409,786 | 10/1946 | Norton | 280/DIG. 3 |
| 2,777,708 | 1/1957 | Patterson | 280/37 |
| 1,554,034 | 9/1925 | Richie | 280/DIG. 3 |
| 2,595,269 | 5/1952 | Keys | 280/36 C X |
| 2,798,731 | 7/1957 | Coffey | 280/37 |
| 3,057,636 | 10/1962 | D'Ettorre et al. | 280/37 |

FOREIGN PATENTS OR APPLICATIONS

| | | | |
|---|---|---|---|
| 145,562 | 4/1935 | Austria | 280/36 |
| 397,165 | 2/1966 | Switzerland | 280/DIG. 3 |
| 1,180,772 | 1/1959 | France | 280/DIG. 3 |

*Primary Examiner*—Benjamin Hersh
*Assistant Examiner*—Robert R. Song
*Attorney*—Watson, Cole, Grindle & Watson

[57] ABSTRACT

A wheeled shopping cart is collapsible so that it may be carried as a hand-bag. The wheels of the cart along with its supports may be collapsed and the cart may thereafter be folded so as to reduce the overall size thereof into a hand carrying bag.

2 Claims, 5 Drawing Figures

PATENTED OCT 31 1972 3,701,541

3,701,541

FOLDING BAGS TO BE USED IN SHOPPING HAVING COLLAPSIBLE WHEELS, AND CAPABLE TO BE REDUCED TO A HAND-BAG

This invention relates to a cart to be used in shopping, and is capable of being folded thereby being reduced in size and shape as a hand-bag which may be carried over the arm. Also, during folding, the hand-bag wheels which are normally provided for shopping are folded and in such a way that they are disposed inside the bag side by side at the bottom thereof so as to be enclosed by the cloth of the folded bag.

In accordance with another aspect of the invention the cart is provided with stiffening means which are likewise collapsed during the folding of the cart into a carrying hand-bag size.

The invention may now be described in relation to a not-limiting illustration of the drawing, in which:

FIG. 5A is a front elevational view of the cart shown in FIG. 5.

Figure 1:
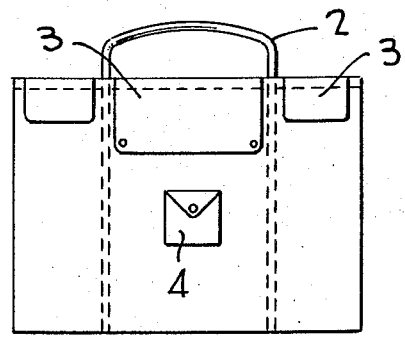
FIG. 1 shows a front elevational view of the folded bag to be used in shopping.

The invention relates to a bag to be used as a shopping cart which, when folded, simulates an handbag capable of being carried by the woman as a normal hand-bag.

As previously noted one feature of the invention is that the bottom and the side of the bag are capable of being folded when the control framework is collapsed. The bag may be made of plastic material.

In the drawings the components of the said cart convertible into a hand-bag are: an envelope (not shown but optionally provided for a container 5 having fastening edges 3 and a handle 2, the container having also a pocket 4 for the carrying of money or keys: a preferably rigid bottom, to which the wheels 6 and the supports 7 are secured; a control-device for the wheels and supports; backing elements 12 for the bottom.

Another feature of the present invention is that the back side of the bag 5 may be provided with such a stiffening means for rigidly supporting the bag, but at the same time is foldable when the cart bottom is collapsed and the cart is folded for the purpose of being transformed into a hand-bag.

Also, the back-side of the bag can be a plastic material suitable for the purpose.

Another feature of the present invention is the use of collapsible wheels 6, whose forks are pivotally secured to rotatable carrying axles 8 each movable by means of a bracket 7 operable as a lever.

Figure 4:
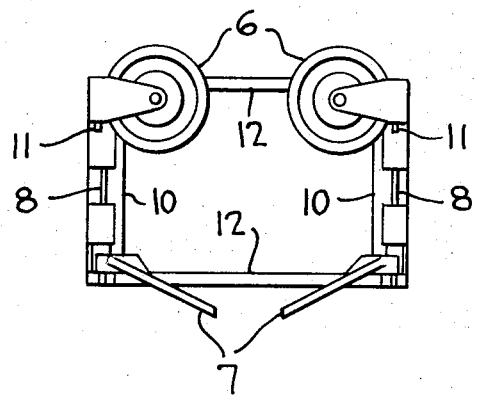
FIG. 4 shows a bottom view of the cart with its foldable wheels and the control framework for the wheels.
Figure 2:
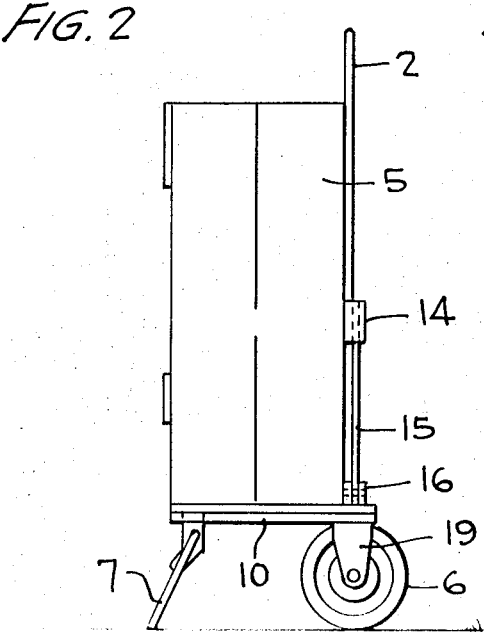
FIG. 2 shows a side elevational view of, the cart as obtained after the opening of the bag shown in FIG. 1.
Figure 3:
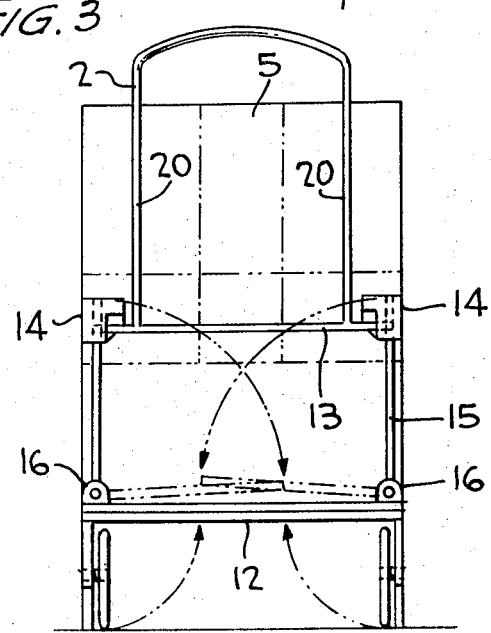
FIG. 3 is a rear elevational view of the cart of FIG. 2.

The rotatable axles 8 are also provided with a coil spring 9 mounted within a housing 21 secured to a support element 10. Bracket 19 of each wheel 6 is secured to an axle 8 at one end thereof which extends through housing 17 at that end. A support 24 is secured to the other end of each axle 8 with bracket 7 being mounted on each support by means of element 20. A coil spring 9 is located within each housing 21 for urging each support 24 and its attached bracket 7 outwardly thereof against a stop element 11' located on backing element 12. A stop element 11 is also mounted on each housing 17. Therefore, the wheel-standing bracket assembly as shown in its collapsed position in FIGS. 2 and 3, is locked in this position as stop elements 11, 11' mate with suitable cutout portions (not shown) provided on brackets 19 and on either supports 24 or in elements 20. When the wheel-standing bracket assembly is rotated 90° to the position shown in FIG. 4, stop elements 11 11' will then each mate with other suitable cutout portions (not shown) provided on brackets 19 and on either supports 24 or on elements 20. Obviously, the assembly must be first shifted in the direction of arrow A against the action of spring 9 so as to disengage the assembly from the first-mentioned cutout portions after which the force of spring 9 will serve to maintain the assembly in engagement with the second-mentioned cutout portions. The assembly may be so shifted by simply grasping brackets 7 and pushing in the direction of arrow A.

Figure 5:
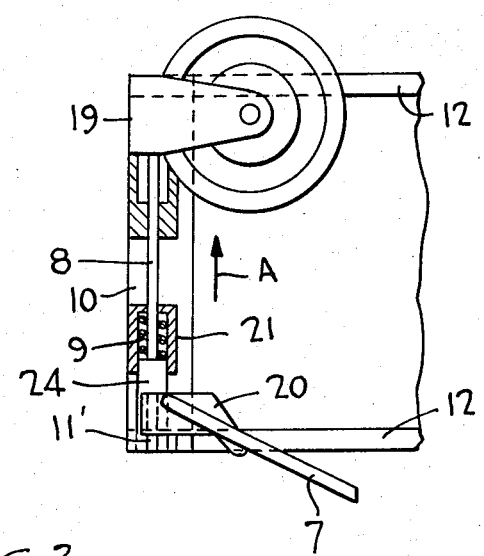
FIG. 5 shows a side elevational view of another embodiment of a cart in which the stiffness of the back side of the said bag has been increased.

In another embodiment of the invention shown in FIG. 5 of the drawing, the use of stiffening means are employed for the bag so as to improve the stiffness of the back side of the bag after it is unfolded into a cart.

In FIG. 2 the legs 2a of handle 2 are slightly elongated as shown in FIG. 3 so as to be attached with a horizontal support 13. Vertical arms 15 are also provided for interconnecting a horizontal support 13 with support 12, it being noted that arms 15 are removably connected to support 13 by means of a bracket 14 so that each support may be disconnected therefrom and pivotally moved at its end 16 in a collapsing position as shown in FIG. 5A by the arrows.

In this way arms 15 according to the direction of the arrows may be pivoted between a supporting portion locked with bracket 14, to a collapsed position parallel to the ground after being disengaged from each bracket.

The opening action is controlled by the housewife who may open the bag by unsnapping flaps 3 and unfold the bag 5 at fold line 24 after which it may be uncrumpled to serve as a container for the goods to be carried. Each lever or bracket 9 is thereafter pivoted 90° so that axle 8, which is common to wheel 6 and bracket 7 on each side, will be rotated so that each wheel and lever will be moved to its position of FIG. 2. Also, during rotation of each axle 8, each assembly becomes disengaged from the first-mentioned cutouts and, after becoming rotated 90°, becomes engaged with the second-mentioned cutouts and is locked in such position by means of spring 9.

The opposite movement for the wheels and levers, of course, takes place when it is desired to again fold the cart into a hand-carrying bag.

The arms 15 must also be pivoted to a vertical position and locked into brackets as seen in FIG. 3.

The bottom portion of the collapsed cart may be folded along line 24 so as to lie in superposed relation with respect to the cart upper portion. Members 2a, 13, 14, 15, 16 and wheels 6 will therefore be interposed between the folded cart bag 5 when fully folded as shown in FIG. 1.

Since the bag 5 as well as all its component parts may be made of plastic, it can be seen that a light handling as well as an easily assembled cart has been provided.

What is claimed is:

1. A collapsible wheeled cart comprising: a container bag having a bottom wall and upstanding side walls; a frame secured to said bottom wall; wheel-standing leg assemblies mounted on said frame; each said assembly comprising an axle located along opposite parallel edges of said frame, wheel means on one end of each said axle and a cart-standing leg on the opposite end of each said axle, said wheel means and said leg being movable about the axis of each said axle to lie parallel to said bottom wall in a collapsed position and perpendicular to said bottom wall in an erect position; stiffening means provided for one of said bag side walls comprising a handle member having depending legs, horizontally aligned brackets secured to said one bag side wall located substantially midway between the upper and lower edges of said side wall, a horizontal support arm mounted to said brackets, said handle member legs being secured to said support arm, arm members each pivotally mounted at one end to said frame about an axis lying transverse to the longitudinal axis of said bag, means releasably securing the opposite ends of said arm members to said brackets, whereby the cart may be fully erected as said wheels and legs are made to lie perpendicular to said bag bottom wall with said arm members secured to said brackets, and whereby the cart may be fully collapsed as said wheels and legs are made to lie parallel to said bag bottom and with said bag being folded along said horizontal support arm, said arm members being pivoted inwardly during the collapse of the cart so as to lie in a face-to-face relationship with respect to said frame.

2. The cart according to claim 1 wherein said assemblies further comprise a spring mounted on said frame and stop elements associated with each said legs and wheel means, said spring being so mounted as to urge said legs and wheel means against said stop elements.

* * * * *